Jan. 10, 1933.   H. J. COWIE   1,894,087
STONE CUTTING IMPLEMENT
Filed April 10, 1929
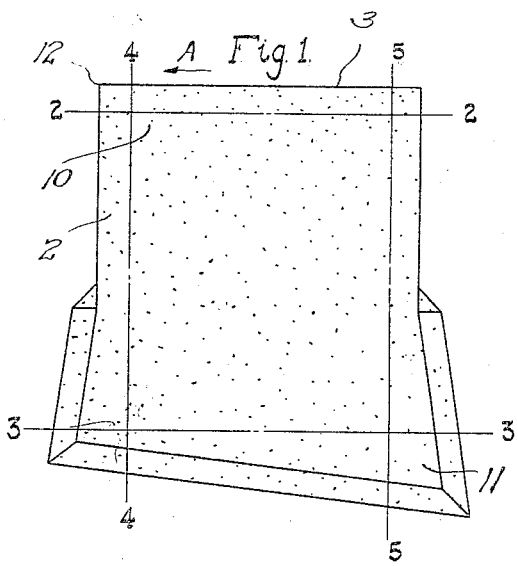
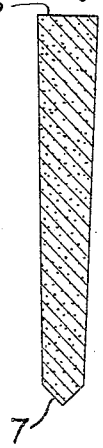 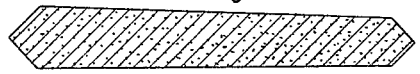 
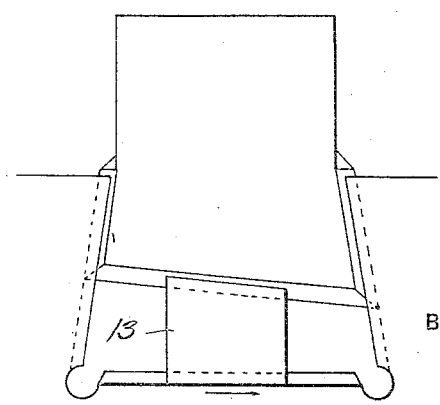
Harry J. Cowie
INVENTOR
BY Thomas C. MacKay
ATTORNEY Patented Jan. 10, 1933

1,894,087

UNITED STATES PATENT OFFICE

HARRY J. COWIE, OF NIAGARA FALLS, ONTARIO, CANADA, ASSIGNOR TO THE CARBORUNDUM COMPANY, OF NIAGARA FALLS, NEW YORK, A CORPORATION OF PENNSYLVANIA

STONE CUTTING IMPLEMENT

Application filed April 10, 1929. Serial No. 354,123.

My invention relates to stone saws particularly of the type described in U. S. Patent 1,198,871, in which teeth formed of bonded abrasive material are inserted in a saw blade of the circular or reciprocating type and securely fastened there. The improved teeth which form the particular subject of my invention are intended for insertion in circular saws. The principal object is to increase the clearance whereby more rapid and even cutting are obtained.

It has been found by experience that the wear on teeth of the kind disclosed in the above patent is not uniform. The wear takes place principally at the front or leading portion of the upper edge of the tooth. In Figure 2 of the patent referred to, the tooth 4 is shown as tapering radially toward the tooth support. As indicated in Figure 4 of the patent the body of the tooth has the same thickness at the leading edge as at the rear edge. In the course of operation however the front portion of the tooth wears more and becomes thinner than the rear portion. Abraded material wedges in between the sides of the teeth and the stone surface with result that the cut in the stone made by the front of the tooth is enlarged in places depending on the amount of débris that collects as indicated above. This gives cuts in the stone of irregular thickness and hence causes uneven surfaces on the stone. To overcome this defect I have constructed teeth of bonded abrasive material which taper not only toward their support but also from the front of the tooth toward the rear end of the same.

My invention is illustrated by the accompanying drawing in which:

Figure 1 is a side view of an insert tooth made according to my invention;

Figure 2 is a section taken on the line 2—2 of Fig. 1.

Figure 3 is a section taken on the line 3—3 of Fig. 1;

Figure 4 is a section taken on the line 4—4 of Fig. 1; and

Figure 5 is a section taken on the line 5—5 of Fig. 1.

Figure 6 shows a method of mounting the tooth in a rotatable disc.

Referring to the drawing in more detail the abrasive tooth 2 has when manufactured a plane peripheral surface which does the grinding or cutting of the stone against which it is rotated. As shown in Fig. 2 the tooth tapers from a leading or front portion 4 where the thickness of the tooth has a maximum value for the given section to the rear portion 5 where the thickness is least for the given section. In other words, the teeth have their cross sections which lie in planes tangential to the periphery of the saw, tapered from a thicker front or leading edge 4 to a thinner rear or following edge 5. Similarly as shown in Fig. 4 the thickness tapers from a maximum thickness for the section at 6 to the smaller thickness indicated at 7. In other words, the teeth have their cross sections which lie in planes extending radially from the axis of the saw, tapered from a thicker outside edge 3 to a thinner inner edge which is clamped in the saw. In the cutting and grinding operation the brunt of the action occurs on the outside surface 3. In addition a polishing action is produced by an area which may be indicated roughly by 10 in Fig. 1 in the case of a comparatively new tooth. Where in contrast to the applicant's design, the section along the line 2—2 is at first of uniform thickness (as shown in the Patent 1,198,871 mentioned above), the débris collects in the region indicated by 10. This débris tends to be carried further back toward the rearward parts of the tooth and thus causes the tooth to jam in the cut. By providing the tapering shape illustrated particularly in Fig. 2 I avoid this binding action.

The portion 11 which lies diagonally opposite the leading edge 12 projects furthest into the mounting in a radial direction and also in a direction opposite to the direction of motion of the tooth. This gives the abrasive tooth an increased leverage at a point at which the said leverage is most needed to resist the turning movement produced by friction against the sides of the tooth near the leading edge. The tooth is carried by its support in the direction of the arrow A shown in Fig. 1.

In the cutting of marble or other stones an abrasive tooth first wears away near the leading edge 12 and on the sides in regions indicated by 10. In this wearing away of the abrasive tooth it performs a certain polishing action on the sides of the cut in the stone, in other words the sides of the abrasive tooth tend to polish the sides of the cut by the action of limited abrasive areas which are separated by the maximum thickness of the tooth. This is found to be the case especially where the teeth are made of fine grains of silicon carbide, which may be bonded with shellac or other bonds as is known in the art. As the tooth wears down it maintains substantially the same relative tapers in directions parallel and perpendicular to the cutting face. When the tooth is worn down so that the cutting surface is adjacent to the support it may be replaced.

The use of my double-tapered teeth has several advantages. In actual trial with these insert teeth, as compared with the single-tapered teeth previously in use, it was found possible to cut Indiana limestone in slabs 26 inches thick easily, whereas the cutting of slabs 24 inches thick had previously been accompanied by the stalling of machinery and a number of delays. The speed of cutting with my new insert tooth was increased in some cases about 75 per cent. The principal advantage however in my new tooth form lies in the greater efficiency. By reason of the greater clearance at the back portion of the tooth the débris is cleared away more rapidly and the friction produced by the rubbing of fragments of stone against the side of the cut is greatly diminished. These fragments which are of the same hardness as the stone itself tend to jam the saw and produce irregular cutting conditions. The amount of power which is used up without any other result than the production of heat is large when clearance is not provided whereby the fragments of stone are promptly thrown out from the space between the saw and the side of the stone.

These advantages appear to be due to the following factors; (1) The relief due to increased clearance and due to the provision of clearance in a plurality of directions greatly reduces the work of cutting and hence the power required to operate the saw, (2) The new shape of the insert tooth permits water to penetrate to the full depth of the cut (this keeps the bond hard and washes away the débris), and (3) The new shape of insert tooth prevents binding in the cut which causes distortion of the saw blade. This distortion causes the blade to come in contact with the work near the support or arbor.

In mounting an inserted abrasive tooth in a stone cutting saw, it is customary to provide the rotatable disc with openings adapted to receive the base portion of the tooth, and to retain the tooth in position by means of outward pressure exerted by a wedge. This form of mounting is shown in Figure 6. The wedge 13 forces the tooth outward, and the sides of the base portion of the tooth are held in intimate contact with the guiding portions of the disc adapted to receive the tooth. It will be observed that with my tooth the thicker edge occurs on the side nearest the wider portion of the wedge. If the disc is rotated with the thicker edge leading, it will be evident that during rotation the friction along the sides of the wedge will tighten the wedge rather than loosen it, whereas if the disc were rotated so that the thinner edge became the leading edge, the reverse effect would obtain and the wedge would become loosened rather than tightened. When my tooth is used in conjunction with this type of mounting, it is therefore desirable that the distance from the peripheral edge to the base of the tooth be smaller in the direction of the thicker or leading edge, as is the case with the tooth shown in Figures 1 to 5, in order that the wedge may be forced into position in a direction away from the thicker edge.

It is believed that the advantages of my particular form of insert tooth will be obvious from the foregoing description.

I claim:

1. An abrasive tooth adapted for mounting on a rotatable support and having a trapezoidal grinding surface that forms the face of the tooth opposite to the support and furthest removed therefrom, said grinding surface tapering from the edge which is used as the front edge in the operation of the tooth to the rear edge of said outer grinding surface while the tooth also tapers from the outer grinding surface towards the support, strong support for said tooth being provided through a root which extends in an opposite direction from the front edge and also extends further from the outer grinding surface than any other portion of the tooth.

2. The method of cutting stone which comprises feeding the stone to a main trapezoidal grinding surface which is tapered in a direction opposite to the direction of motion of the said surface to provide gradually increasing clearance for débris at greater distances from the leading edge, while clearance is also provided in gradually increasing amount from the surface being ground toward the opening of the cut, and maintaining such relative movement between the material to be cut and said grinding surface that the wider edge of the grinding surface is always the leading edge.

3. An abrasive tooth for stone saws, the tooth having a base portion adapted for mounting in a rotatable support and a grinding surface opposite the said base portion, the tooth being tapered so that a section parallel to the said grinding surface tapers along its length, the base portion of the tooth becoming wider as the distance from the said grinding surface increases, the edge of the base portion opposite the said grinding surface being inclined at an angle from the said grinding surface, the distance between the said grinding surface and the edge opposite being greater in the direction in which the width of the said grinding surface decreases.

4. An abrasive tooth for stone saws, the tooth having a base portion adapted for mounting in a rotatable support and a grinding surface opposite the said base portion, the tooth being tapered in two directions so that a section parallel to the said grinding surface tapers along its length and a section at right angles to the said grinding surface tapers from the said grinding surface toward the base portion of the tooth, the base portion of the tooth becoming wider as the distance from the said grinding surface increases, the edge of the base portion opposite the said grinding surface being inclined at an angle from the said grinding surface, the distance between the said grinding surface and the edge opposite being greater in the direction in which the width of the said grinding surface decreases.

5. The process of cutting stone, which comprises rotating a circular stone cutting saw having insert teeth of bonded abrasive material, which teeth have their cross sections in planes tangential to the periphery of the saw tapering from a thicker front or leading edge to a thinner rear or following edge, the direction of rotation being such that the teeth first engage the stone at their thicker front or leading edges, and causing a relative bodily feeding movement between the saw and the stone so as to cause the saw to engage and cut into the stone.

6. The process of cutting stone, which comprises rotating a circular stone cutting saw having insert teeth of bonded abrasive material, which teeth have their cross sections in planes tangential to the periphery of the saw tapering from a thicker front or leading edge to a thinner rear or following edge, the teeth also having their cross sections in planes extending radially from the saw tapered from their thicker outer edges which engage the stone to their thinner inner edges which are clamped in the saw, the direction of rotation being such that the teeth first engage the stone at their thicker front or leading edges, and causing a relative bodily feeding movement between the saw and the stone so as to cause the saw to engage and cut into the stone.

In testimony whereof I affix my signature.

HARRY J COWIE.